United States Patent
You et al.

(10) Patent No.: US 7,298,433 B2
(45) Date of Patent: Nov. 20, 2007

(54) LIQUID CRYSTAL DISPLAY MODULE HAVING STRUCTURE FOR PREVENTING WIRES FROM BEING DAMAGED AND METHOD OF FABRICATING THE SAME

(75) Inventors: Dong-Jae You, Gyeongsangbuk-do (KR); Seung-Won Hwang, Incheon (KR); Moon-Soo Yeom, Gyeongsangnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 463 days.

(21) Appl. No.: 10/974,998

(22) Filed: Oct. 28, 2004

(65) Prior Publication Data

US 2005/0094054 A1 May 5, 2005

(30) Foreign Application Priority Data

Oct. 30, 2003 (KR) .................... 10-2003-0076134

(51) Int. Cl.
*G02F 1/1333* (2006.01)
*G06F 1/16* (2006.01)

(52) U.S. Cl. ................. 349/58; 349/65; 361/681

(58) Field of Classification Search ............ 349/58, 349/59, 60, 61, 65; 361/681, 683; 362/632, 362/633, 634; 345/905
See application file for complete search history.

(56) References Cited

U.S. PATENT DOCUMENTS 6,501,642 B2* 12/2002 Kim ........................ 361/681
6,762,806 B1* 7/2004 Matsuo et al. .............. 349/58
7,048,418 B2* 5/2006 Hur et al. .................. 362/457

* cited by examiner

*Primary Examiner*—Toan Ton
*Assistant Examiner*—Tai Duong
(74) *Attorney, Agent, or Firm*—Morgan, Lewis & Bockius LLP (57) ABSTRACT

A liquid crystal display module includes a bottom case, a main support on the bottom case, the main support including a wire holding hook having first and second finger portions, a backlight assembly on the main support, the backlight assembly including a lamp connected to wires, the wires extending to outside of the module via the wire holding hook, a liquid crystal panel over the backlight assembly, and a top case being coupled to the bottom case and accommodating the main support, the backlight assembly and the liquid crystal panel therebetween.

14 Claims, 6 Drawing Sheets

LIQUID CRYSTAL DISPLAY MODULE HAVING STRUCTURE FOR PREVENTING WIRES FROM BEING DAMAGED AND METHOD OF FABRICATING THE SAME

The present invention claims the benefit of Korean Patent Application No. 2003-0076134 filed in Korea on Oct. 30, 2003, which is hereby incorporated by reference.

BACKGROUND OF THE INVENTION

1. Field of the Invention

The present invention relates to a liquid crystal display device, and more particularly, to a liquid crystal display module having a structure for protecting lead wires of a backlight device from being damaged and a method of fabricating the same.

2. Discussion of the Related Art

Flat panel display devices are increasingly being used in portable devices and household appliances because of their advantageous characteristics of thin profile, lightness, and low power consumption. There are many types of flat panel display devices, such as plasma display panels (PDPs), field emission displays (FEDs), and the widely used liquid crystal display (LCD) devices. While the principles of the present invention are generally applicable to all such displays, it will be discussed with respect to an LCD device used in a portable computer, a computer monitor, or a television as an example.

LCD devices use optical anisotropy and polarization properties of liquid crystal molecules to generate a desired image. In particular, liquid crystal molecules can be aligned in a specific orientation, which can be controlled by applying an electric field across the liquid crystal molecules. Due to the optical anisotropy, incident light is refracted according to the orientation of the liquid crystal molecules, thereby generating the desired image.

In general, a liquid crystal module (LCM) for an LCD device includes a liquid crystal panel having upper and lower substrates with a liquid crystal material interposed therebetween, a backlight assembly having a lamp, a light reflector, a light guide plate and a plurality of optical sheets, a main support supporting the liquid crystal panel and the backlight assembly, and top and bottom cases protecting and accommodating the liquid crystal panel and the backlight assembly.

Figure 1:
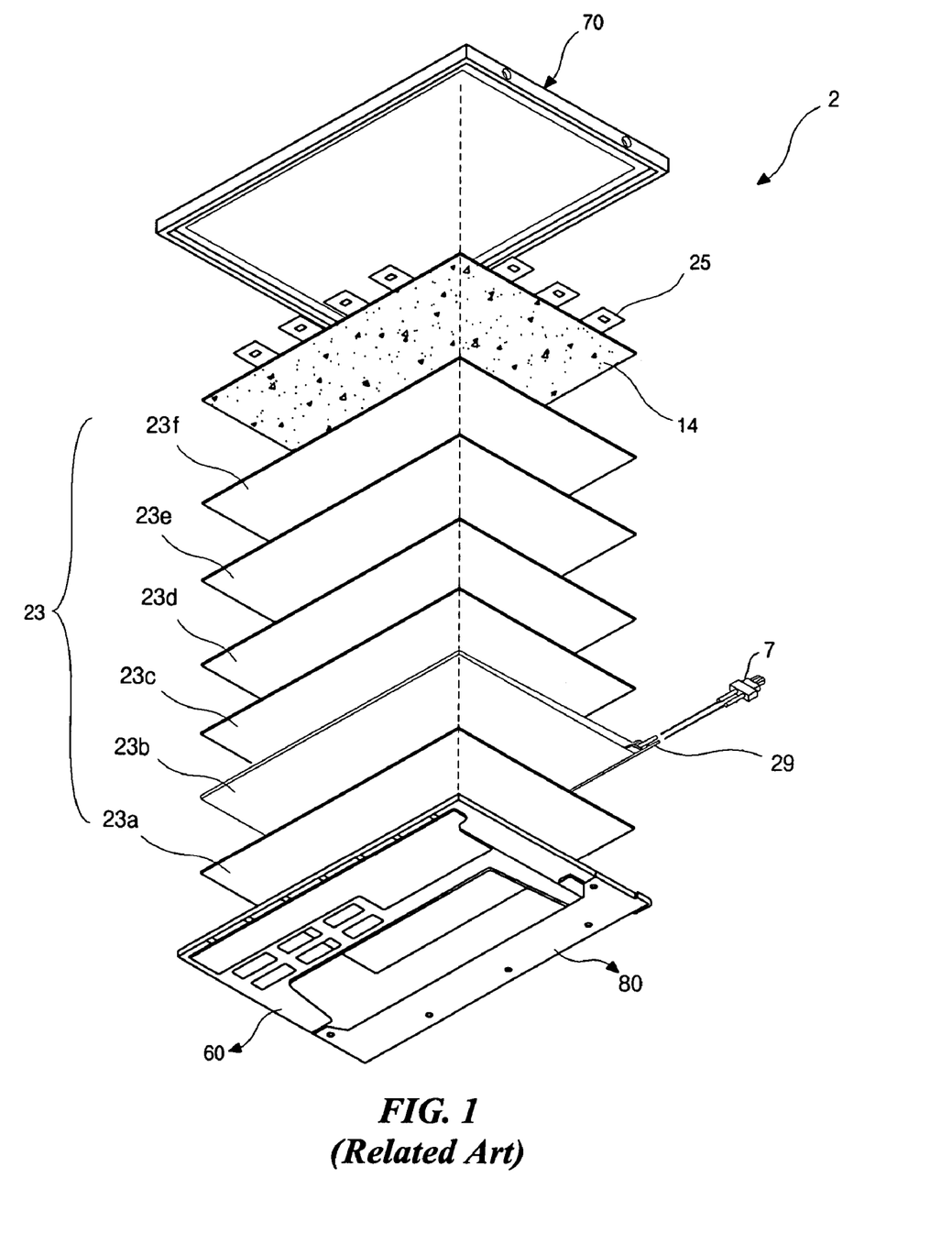
FIG. 1 is an exploded perspective view illustrating a liquid crystal display module according to the related art.

FIG. 1 is an exploded perspective view illustrating a liquid crystal display module according to the related art. In FIG. 1, a liquid crystal module 2 includes a main support 60, a top case 70, and a bottom case 80. The main support 60 is coupled to the bottom case 80 such that the main support 60 is protected from being twisted and wrinkled. In particular, the bottom case 80 is generally formed of a metallic material, such as stainless steel, and the main support 60 is generally formed of a plastic material.

In addition, a backlight assembly 23 having a lamp 29 is supported by the main support 60 and the bottom case 80. The backlight assembly 23 also includes a reflector 23a, a light guide plate 23b, a first diffusing/protecting sheet 23c, first and second prism sheets 23d and 23e, and a second diffusing/protecting sheet 23f, which are layered in sequence between the main support 60 and a liquid crystal panel 14. In particular, the lamp 29 is disposed at one side of the light guide plate 23b. The lamp 29 generally is a cold cathode fluorescent lamp (CCFL) and connects to a connector 7 outside of the liquid crystal display module 2.

Further, the liquid crystal (LC) panel 14 is connected to a printed circuit board (PCB) 25 by a flexible film. When the liquid crystal module 2 is assembled, the PCB 25 is folded onto the bottom of the main support 60, and the top case 70 is coupled to the bottom case 80. As a result, the top case 70 and the main support 60 hold and retain the liquid crystal panel 14 and the backlight assembly 23 together. Although not shown, the main support 60 may be alternatively disposed adjacent to the liquid crystal panel 14.

The backlight assembly 23 can be a direct-type backlight device or an edge-type backlight device. In a direct-type backlight device, a light source is generally disposed underneath the light guide plate. Light generated from the light source is reflected onto a back surface of the liquid crystal panel using the reflector and diffused using a diffuser sheet. Thus, the direct-type backlight device can be used for the wall-mounted television requiring a high brightness. However, the direct-type backlight device has disadvantages, such as being relatively thick, consuming significant power, and having a high fabrication cost.

In comparison, an edge-type backlight device receives light through one side of a plate-shaped light guide comprised of a transparent acryl resin. The edge-type backlight device directs the received light to a light outputting surface of the light guide plate such that it illuminates the back of a liquid crystal panel. In order to improve light efficiency, an optical reflective plate or an optical reflective film is often provided on the opposite side of the light output surface of the light guide plate. To make the light output uniform, a light diffuser sheet is often provided at the light output surface of the light guide plate. The edge-type backlight device is lightweight, has a thin profile, and consumes little power. Thus, the edge-type backlight device is highly suitable for portable computers.

Figure 2:
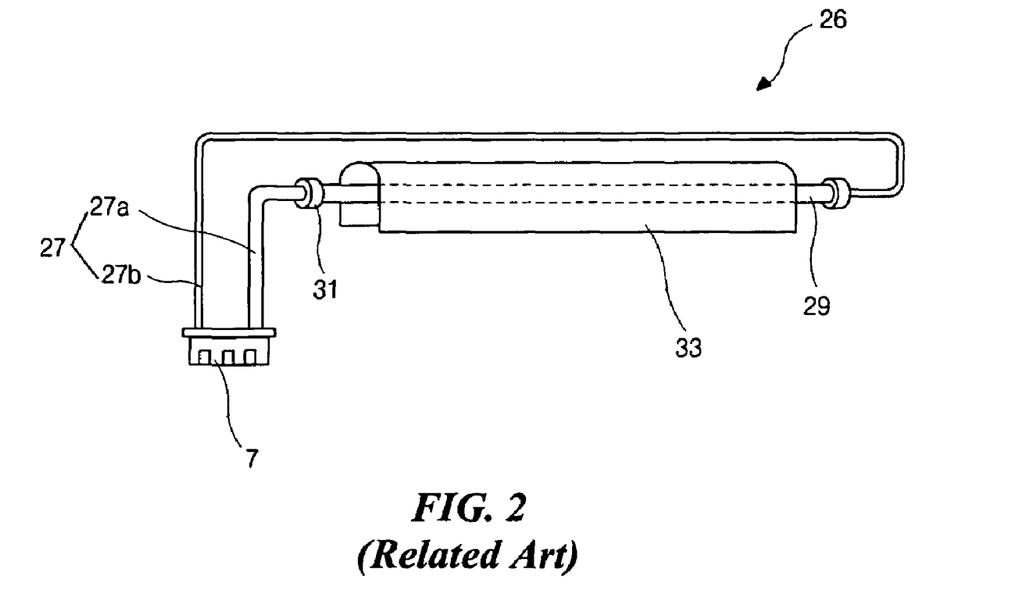
FIG. 2 is a view of an illuminating section of a backlight device according to the related art.

FIG. 2 is a view of an illuminating section of a backlight device according to the related art. In FIG. 2, the illuminating section 26 of a backlight device includes the lamp 29, a lamp holder 31, a lamp housing 33, and wires 27. The lamp housing 33 reflects light emitted from the lamp 30 toward a desired direction, and the wires 27 include a power wire 27a and a ground wire 27b. The power wire 27a and the ground wire 27b are disposed between the connector 7 and the lamp 29. In particular, the power wire 27a is soldered to one end of the lamp and the ground wire 27b is soldered to another end of the lamp 29. Further, the lamp holder 31 covers the solder connections between the lamp 29 and the power and ground wires 27a and 27b. Although not shown in FIG. 2, the connector 7 is connected to an inverter power supply circuit such that the wires 27 supply power to drive the lamp 29.

Figure 3:
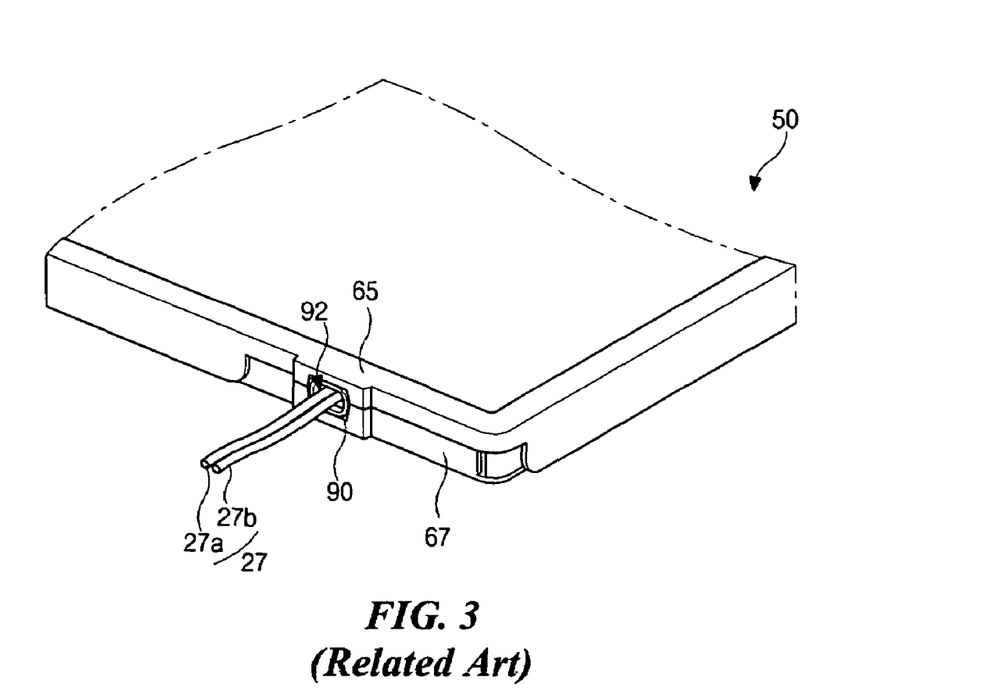
FIG. 3 is a partially enlarged perspective view of a liquid crystal display module according to the related art.

FIG. 3 is a partially enlarged perspective view of a liquid crystal module according to the related art. As shown in FIG. 3, when a liquid crystal module 50 is assembled, there exists a wire outlet portion near one of its corner portions to allow the wires 27 that are connected to the lamp 29 be extended to the outside of the liquid crystal module 50. In particular, a top case 65 and a bottom case 67 are coupled to each other and hold a liquid crystal panel and a backlight assembly therebetween. A wire holder 90 having an opening 92 is disposed at the wire outlet portion, such that the wires 27 pass through the opening 92 to exit out of the liquid crystal panel 50. Although not shown in FIG. 3, the wires 27 are connected to the connector 7 (as shown in FIG. 2).

The top and bottom cases 65 and 67 are generally made of a metallic material through a molding die process, and they may have cutting burrs at their edges after the press molding. The burrs formed at the edge portions of the top and bottom cases 65 and 67 may damage the coated material of the wires 27 and then may cause a short between the wires 27. Therefore, the wire holder 90 is provided at the wire outlet portion between the top and bottom cases 65 and 67 to protect the wires 27.

Figure 4:
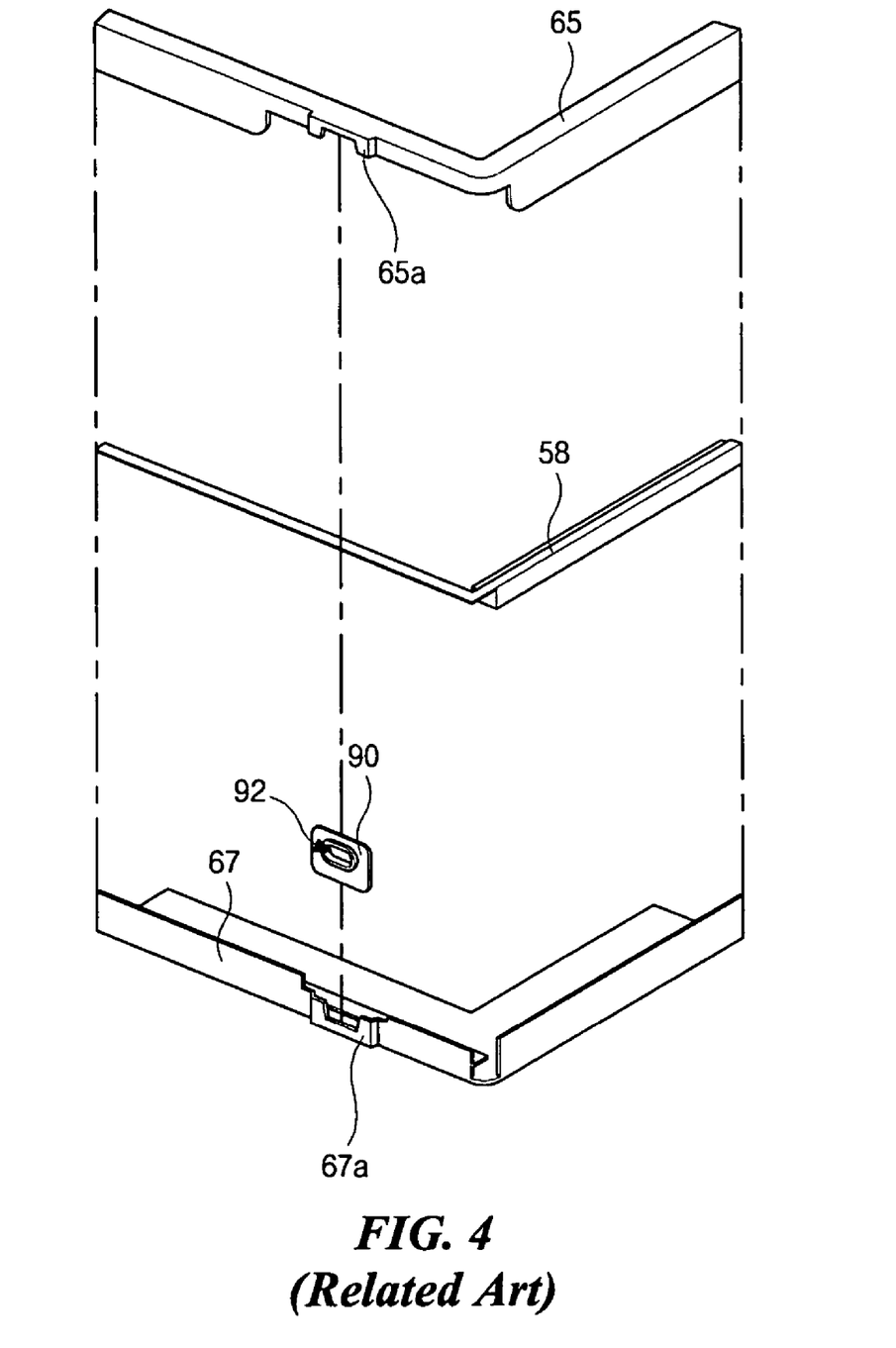
FIG. 4 is an exploded perspective view of the liquid crystal display module shown in FIG. 3.

FIG. 4 is an exploded perspective view of the liquid crystal module shown in FIG. 3, and the liquid crystal panel and the backlight assembly are not depicted in FIG. 4 for the purpose of simplifying the figure. In addition, although not shown in FIG. 4, the wires 27 are pulled through the opening 92 of the wire holder 90 (as shown in FIG. 3) before the wire holder 90 is inserted between the top and bottom cases 65 and 67. As shown in FIG. 4, the top and bottom cases 65 and 67 respectively have protrusions 65a and 67a along one of their edges.

When assembling the liquid crystal module, the wire holder 90 is first mated with the protrusion 67a of the bottom case 67 by sliding into it. Thereafter, a main support 58 on which the liquid crystal panel and the backlight assembly are disposed is laid onto the bottom case 67 while the wires are inserted through the opening 92. Then, the top case 65 is coupled to the bottom case 67. As a result, the wire holder 90 is supported and fastened by the protrusions 65a and 67a of the top and bottom cases 65 and 67.

However, since the wire holder 90 is to be coupled to the bottom case 67 first, additional time is required to carefully put and slide down the wire holder 90 into the protrusion 67a, thereby increasing assembling time and reducing labor efficiency. Moreover, because the wire holder 90 is a separate element from the top and bottom cases 65 and 67, fabrication cost is increased.

SUMMARY OF THE INVENTION

Accordingly, the present invention is directed to a liquid crystal display module having a structure for preventing wires from being damaged and a method of fabricating the same that substantially obviates one or more of the problems due to limitations and disadvantages of the related art.

An object of the present invention is to provide a liquid crystal display module having a structure that prevents damages in lamp wires.

Another object of the present invention is to provide a liquid crystal display module that improves labor efficiency, reduces assembly time, and decreases production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the liquid crystal display module includes a bottom case, a main support on the bottom case, the main support including a wire holding hook having first and second finger portions, a backlight assembly on the main support, the backlight assembly including a lamp connected to wires, the wires extending to outside of the module via the wire holding hook, a liquid crystal panel over the backlight assembly, and a top case being coupled to the bottom case and accommodating the main support, the backlight assembly and the liquid crystal panel therebetween.

In another aspect, the method of assembling a liquid crystal display module includes assembling a backlight device including placing a lamp therein, connecting the lamp to a connector via wires, disposing the backlight device on a main support, the main support including a wire holding hook having first and second finger portions, guiding the wires to pass between the first and second finger portions of the wire holding hook, disposing the main support on a bottom case, disposing a liquid crystal panel over the backlight device, and coupling the bottom case to a top case such that the wires extend to outside of the module via the wire holding hook.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5A:
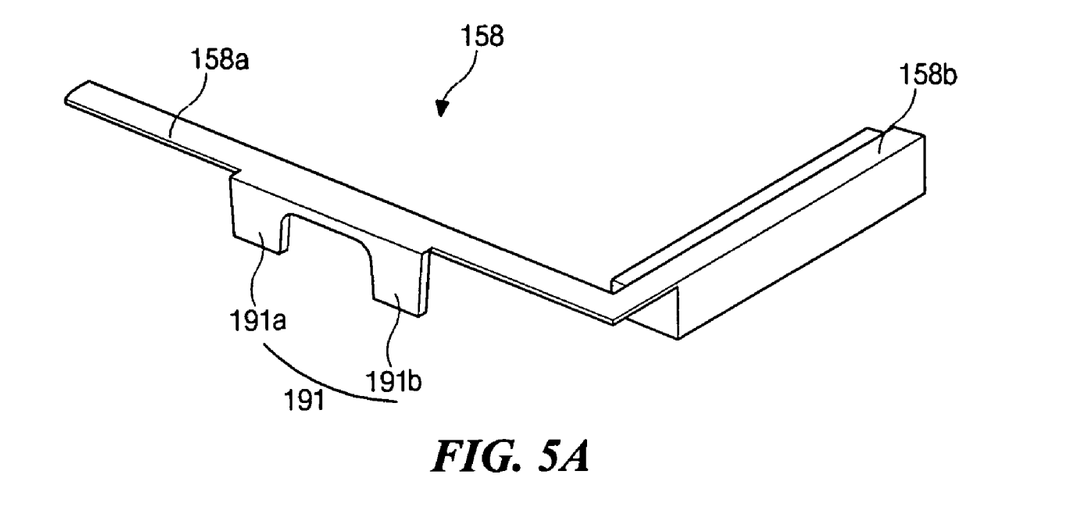
FIGS. 5A and 5B are upper and lower perspective views of a support of a liquid crystal display module according an embodiment of the present invention.
Figure 5B:
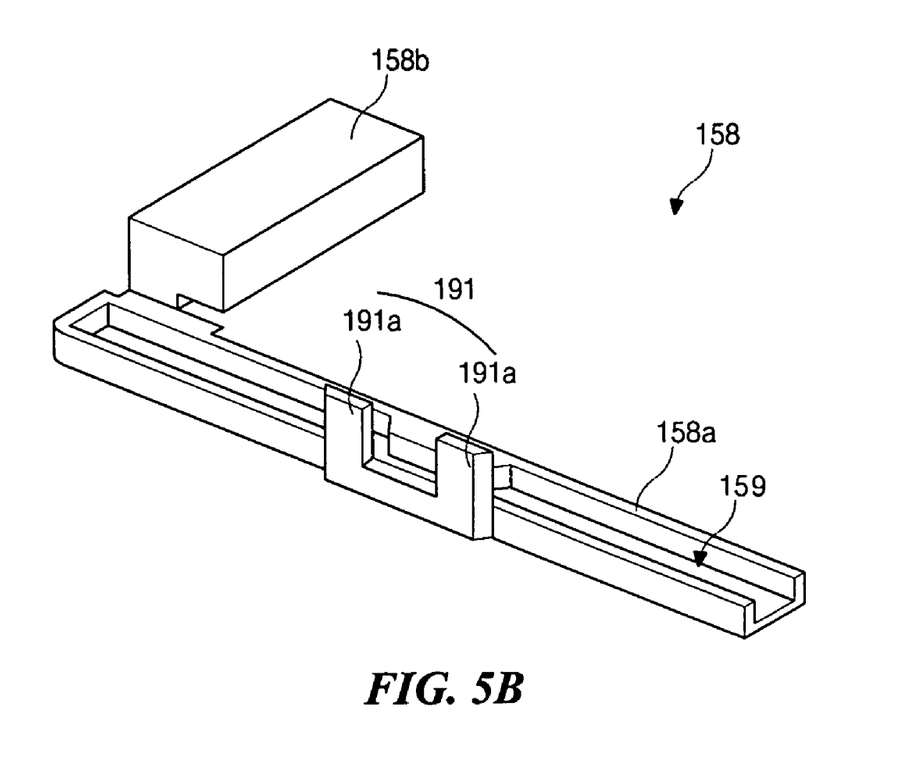

FIGS. 5A and 5B are upper and lower perspective views of a support of a liquid crystal display module according an embodiment of the present invention. Although not fully shown in FIGS. 5A and 5B, a support 158 is a rectangular frame having a side portion 158b being thicker than a front portion 158a. As shown in FIG. 5A, the side portion 158b has a plurality of steps such that a light guide plate and optical sheets of a backlight assembly may be held in place by these steps. Thus, these steps of the side portion 158b prevent wires that are connected to a lamp of the backlight assembly (not shown) from moving caused by free movement of the backlight assembly.

In addition, the front portion 158a includes a wire holding hook 191 on its front side. The wire holding hook 191 has a first finger portion 191a and a second finger portion 191b to hold and fasten the wires. In particular, the first and second finger portions 191a and 191b are spaced apart from each other and perpendicularly extend from the front portion 158a to allow the wires to be extended from the lamp and to pass through between the first and second finger portions 191a and 191b. More specifically, the first and second finger portions 191a and 191b may be separated by a distance substantially equal to the sum of diameters of the wires. The wire holding hook 191 may preferably have a thickness smaller than that of the front portion 158a.

Further, the wire holding hook 191 is protruded slightly from the front side of the front portion 158a, and then extends along a direction perpendicular to a bottom surface of the front portion 158a such that the first and second finger portions 191a and 191b are extending downwards. In particular, the first and second finger portions 191a and 191b may extend covering an outer side of the bottom case (not shown).

As shown in FIG. 5B, the front portion 158a is thinner than the side portion 158b. Thus, the lamp of the backlight assembly may be accommodated between the front portion 158a and a corresponding portion of the bottom case (not shown). In addition, the front portion 158a includes a wire guiding passage 159 along a longitudinal direction on its bottom surface. The wire guiding passage 159 may guide and lead the wires to the wire holding hook 191. As a result, the wire guiding passage 159 holds the wires together with the wire holding hook 191 and prevents the wire from movement when the liquid crystal display module is assembled.

Figure 6:
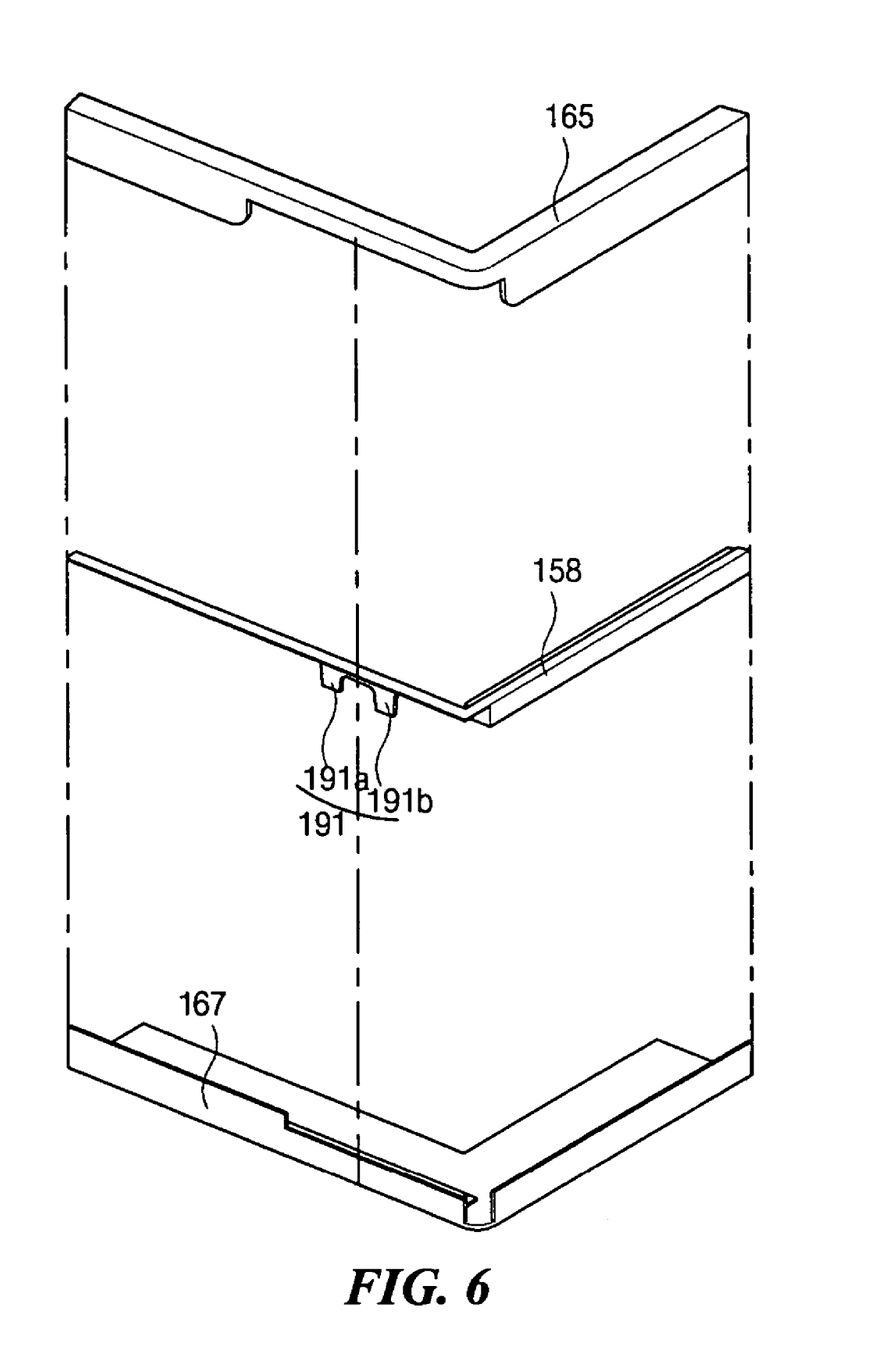
FIG. 6 is an exploded perspective view of a liquid crystal display module having the support shown in FIGS. 5A and 5B according to an embodiment of the present invention.

FIG. 6 is an exploded perspective view of a liquid crystal display module having the support shown in FIGS. 5A and 5B according to an embodiment of the present invention. As shown in FIG. 6, a liquid crystal display module includes the support 158, a top case 165, and a bottom case 167. The top and bottom cases 165 and 167 may be formed of a metallic material, such as stainless steel, and the support 158 may be formed of a plastic material. In particular, the support 158 including the wire holding hook 191 is disposed over the bottom case 167, and the top case 165 is disposed over the support 158. When the support 158 is assembled with the bottom case 167, the first and second finger portions 191a and 191b are extending toward the bottom case 167. Although not shown in FIG. 6, the liquid crystal panel and the backlight assembly are disposed on the support 158 such that the wires are held in place by the wire holding hook 191.

Unlike the liquid crystal display module according the related art as shown in FIG. 4, the liquid crystal display module according to an embodiment of the present invention does not include a separate wire holder element, and the top and bottom cases do not have protrusions for holding such a wire holder. Therefore, when assembling the liquid crystal display module according to an embodiment of the present invention, the step of inserting the wires through an opening of a wire holder is not required. According to an embodiment of the present invention, the support 158 and the wire holding hook 191 may be formed integrally, and the wires may be held between the first and second finger portions 191a and 191b of the wire holding hook 191 as the support 158 is held between the top and bottom cases 165 and 167.

Moreover, when assembling the liquid crystal module according to the related art shown in FIG. 4, the connector 7 (shown in FIG. 2) is not connected to the wires in advance because the wires need to first be pulled through the opening of the wire holder. However, according to an embodiment of the present invention, the wires may already be connected to a connector (not shown) as the wires are being placed between the first and second finger portions 191a and 191b of the support 158 and as the liquid crystal display module being assembled. Therefore, assembling time for the liquid crystal display module according to an embodiment of the present invention decreases and labor efficiency increases.

Figure 7:
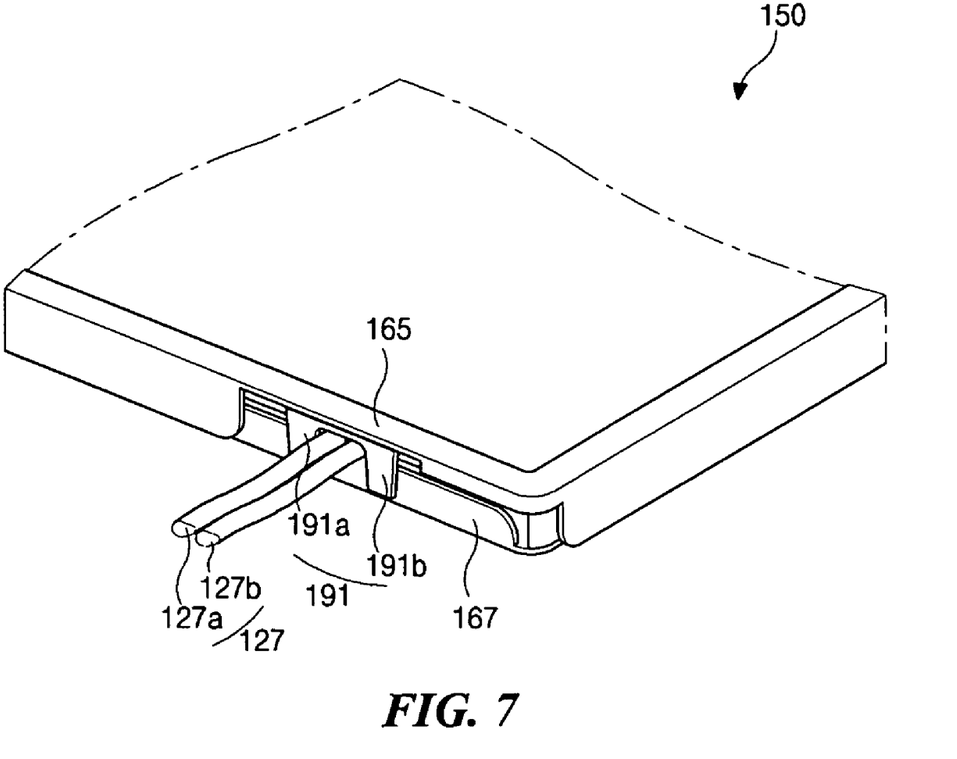
FIG. 7 is a partial perspective view of the liquid crystal display module shown in FIG. 6 when assembled.

FIG. 7 is a partial perspective view of the liquid crystal display module shown in FIG. 6 when assembled. As shown in FIG. 7, when a liquid crystal display module 150 is assembled, wires 127 that are connected with a lamp may extend to the outside of the module 150 near one of corner portions of the module 150. In particular, when the top case 165 is coupled to the bottom case 167, the top and bottom cases 165 and 167 hold the main support 158 (shown in FIG. 6), a backlight device (not shown), and a liquid crystal panel (not shown) therebetween. The first and second finger portions 191a and 191b of the wire holding hook 191 may overlap a portion of an exterior side surface of the bottom case 167, and the first and second finger portions 191a and 191b may have a length shorter than a height of the side of the bottom case 167.

Further, the first and second finger portions 191a and 191b hold and affix the wires 127, thereby preventing the wires 127 from free movement. The wires 127 may include a power wire 127a and a ground wire 127b connected to an outside source for driving the lamp that is held within the liquid crystal display module 150. In particular, since the wire holding hook 191 holds and protects the wires 127, the coated material of the wires 127 is not damaged from the cutting burrs that may be formed on the top and bottom cases 165 and 167.

As a result, the liquid crystal display module according to an embodiment of the present invention has the following advantages. First, since the wires come out of the liquid crystal display module through the space between the finger portions of the wire holding hook, the wires do not directly contact the top frame and the bottom cover. Thus, wire damage and short-circuits are prevented. Second, because a separate wire holder element is not required, the production cost is reduced. Third, since the connector can be connected to the wires prior to the wires being placed between the finger portions of the wire holding hook, the liquid crystal module is more easily assembled requiring less assembling time, thereby improving labor efficiency.

Moreover, the method of assembling a liquid crystal display module according an embodiment of the present invention may include assembling a backlight device including placing a lamp therein, and connecting the lamp to a connector via wires prior to disposing the backlight device on a main support. Then, the backlight device may be disposed on the main support, which includes a wire holding hook having first and second finger portions. Then, the wires may be passed between the first and second finger portions of the wire holding hook to securely affix the wires. Subsequently, the main support may be disposed on a bottom case, a liquid crystal panel may be disposed over the backlight device, and the bottom case may be coupled to a top case such that the wires extend to outside of the module via the wire holding hook. As a result, since the connector can be connected to the wires prior to the wires being placed between the finger portions of the wire holding hook, the liquid crystal module is more easily assembled requiring less assembling time, thereby improving labor efficiency.

It will be apparent to those skilled in the art that various modifications and variations can be made in the liquid crystal display module of the present invention without departing from the sprit or scope of the invention. Thus, it is intended that the present invention covers the modifications and variations of this invention provided they come within the scope of the appended claims and their equivalents.

What is claimed is:

1. A liquid crystal display module, comprising:
   a bottom case;
   a main support on the bottom case, the main support including a wire holding hook having first and second finger portions;
   a backlight assembly on the main support, the backlight assembly including a lamp connected to wires, the wires extending to outside of the module via the wire holding hook;
   a liquid crystal panel over the backlight assembly; and
   a top case being coupled to the bottom case and accommodating the main support, the backlight assembly and the liquid crystal panel therebetween.

2. The liquid crystal display module of claim 1, wherein the main support and the wire holding hook are integrally formed as a single body.

3. The liquid crystal display module of claim 1, wherein the first and second finger portions overlap a portion of an exterior surface of the bottom case.

4. The liquid crystal display module of claim 1, wherein the first and second finger portions are spaced apart from each other by a distance substantially equal to a sum of diameters of the wires.

5. The liquid crystal display module of claim 1, wherein the first and second finger portions have a length shorter than a height of the side of the bottom case.

6. The liquid crystal display module of claim 1, wherein the main support is a rectangular frame and includes side portions and a front portion.

7. The liquid crystal display module of claim 6, wherein the wire holding hook is protruded perpendicularly from a side of the front portion, and the first and second finger portions extend along a direction perpendicular to a bottom surface of the front portion toward the bottom case.

8. The liquid crystal display module of claim 6, wherein the front portion of the main support has a wire guiding passage to lead the wires to the wire holding hook.

9. The liquid crystal display module of claim 6, wherein the front portion has a smaller thickness than the side portions.

10. The liquid crystal display module of claim 6, wherein the first and second finger portions have a thickness smaller than that of the front portion.

11. The liquid crystal display module of claim 6, wherein the side portions have a plurality of steps to hold the backlight assembly.

12. The liquid crystal display module of claim 6, wherein the backlight assembly includes a lamp housing surrounding the lamp, and the lamp housing is disposed on the bottom case corresponding to the front portion of the main support.

13. The liquid crystal display module of claim 1, wherein the first and second finger portions constitutes an U-shape.

14. The liquid crystal display module of claim 1, wherein the backlight assembly includes a light guide plate and optical sheets.

* * * * *